(12) United States Patent
Qian et al.

(10) Patent No.: US 11,205,781 B2
(45) Date of Patent: Dec. 21, 2021

(54) FILAMENTARY POSITIVE ELECTRODE FOR SOLID BATTERY, SOLID BATTERY, MANUFACTURING METHOD OF FILAMENTARY POSITIVE ELECTRODE FOR SOLID BATTERY AND MANUFACTURING METHOD OF SOLID BATTERY

(71) Applicant: Honda Motor Co.,Ltd., Tokyo (JP)

(72) Inventors: Pu Qian, Saitama (JP); Toshio Tokune, Saitama (JP); Mitsumoto Kawai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 16/439,714

(22) Filed: Jun. 13, 2019

(65) Prior Publication Data

US 2019/0386316 A1  Dec. 19, 2019

(30) Foreign Application Priority Data

Jun. 14, 2018 (JP) .............................. JP2018-113761

(51) Int. Cl.
*H01M 4/75* (2006.01)
*H01M 4/02* (2006.01)
*H01M 10/058* (2010.01)

(52) U.S. Cl.
CPC ........... *H01M 4/75* (2013.01); *H01M 10/058* (2013.01); *H01M 2004/022* (2013.01)

(58) Field of Classification Search
CPC ...... H01M 10/0525; H01M 4/13; H01M 4/58; H01M 4/62; H01M 10/052; H01M 4/70; H01M 4/02
See application file for complete search history.

(56) References Cited

U.S. PATENT DOCUMENTS

2012/0219844 A1* 8/2012 Tsutsumi .............. H01M 4/136
429/153
2016/0226096 A1* 8/2016 Tsujiko .................. H01M 4/622

FOREIGN PATENT DOCUMENTS

| JP | 2000106154 | | 4/2000 |
| JP | 2003317794 | A * | 11/2003 |
| WO | 2011007548 | | 1/2011 |

* cited by examiner

*Primary Examiner* — Maria Laios
*Assistant Examiner* — Grace Ann Kenlaw
(74) *Attorney, Agent, or Firm* — JCIPRNET

(57) ABSTRACT

The disclosure provides a filamentary positive electrode for solid battery, a solid battery having the filamentary positive electrode for solid battery, a manufacturing method of the filamentary positive electrode for solid battery, and a manufacturing method of the solid battery having the filamentary positive electrode for solid battery. The structure of a positive electrode that constitutes a solid battery is a filamentous structure. A positive electrode active material layer including a positive electrode active material is provided on a surface of a conductive positive electrode filament, and a positive electrode electrolyte layer including an electrolyte is further provided on an outer side of the positive electrode active material layer to form a filamentary positive electrode for solid battery. The filamentary positive electrode for solid battery and a filamentary negative electrode for solid battery, which has a filamentous structure, are laminated to form a solid battery.

5 Claims, 4 Drawing Sheets

FILAMENTARY POSITIVE ELECTRODE FOR SOLID BATTERY, SOLID BATTERY, MANUFACTURING METHOD OF FILAMENTARY POSITIVE ELECTRODE FOR SOLID BATTERY AND MANUFACTURING METHOD OF SOLID BATTERY

CROSS-REFERENCE TO RELATED APPLICATION

This application claims the priority of Japan patent application serial no. 2018-113761, filed on Jun. 14, 2018. The entirety of the above-mentioned patent application is hereby incorporated by reference herein and made a part of this specification.

BACKGROUND

Technical Field

The disclosure relates to a filamentary positive electrode for solid battery, a solid battery, a manufacturing method of the filamentary positive electrode for solid battery, and a manufacturing method of the solid battery.

Description of Related Art

Lithium ion secondary batteries have been widely used as secondary batteries that have a high energy density. A lithium ion secondary battery has a structure, in which a separator is present between the positive electrode and the negative electrode, and a liquid electrolyte (electrolytic solution) is filled therein.

Since the electrolytic solution in the lithium ion secondary battery is usually a flammable organic solvent, particularly the safety against heat may be a problem. Therefore, a solid battery that uses an inorganic solid electrolyte in place of the organic liquid electrolyte has also been proposed (see Japanese Laid-open No. 2000-106154).

A solid secondary battery has a solid or gel electrolyte layer as the electrolyte layer between the positive electrode and the negative electrode. The solid battery that uses a solid electrolyte solves the problem of heat as compared with a battery that uses an electrolytic solution, and can raise the voltage through lamination and further cope with the demand for compactness.

Such a lithium ion secondary battery is repeatedly used by charging and discharging. However, it is desirable to further reduce the charging time of the lithium ion secondary battery. Regarding the charging time of an electric vehicle, currently about 8 hours are necessary to charge an electric vehicle by normal charging, and it will take about 30 minutes even by fast charging.

In recent years, as the energy consumption of the equipment using the battery increases, it is desired to further increase the energy density of the lithium ion secondary battery. Then, an electric storage device using fiber-shaped positive electrode and negative electrode has been proposed for the purpose of increasing the capacity per volume of the lithium ion secondary battery (see International Publication No. 2011/007548 pamphlet).

In International Publication No. 2011/007548 pamphlet, an electric storage device with dramatically improved battery performance is obtained by combining a fiber positive electrode and a fiber negative electrode. The fiber positive electrode is formed by forming a specific positive electrode active material coating film on the surface of a conductive fiber, and the fiber negative electrode is composed of a conductive fiber.

Here, in the solid battery, the factor that has the greatest influence on the battery performance is the contact interface between the positive electrode active material and the positive electrode electrolyte layer. On the other hand, since it is easy to form the contact interface between the negative electrode active material and the electrolyte in the negative electrode, it is not a problem. Regarding the contact interface in the positive electrode, for example, a known method is to cover the surface of a positive electrode active material with a positive electrode active material to form the contact interface in advance, so as to prevent the battery performance from dropping.

However, in the electric storage device using fiber electrodes described in International Publication No. 2011/007548 pamphlet, it is the negative electrode that has the active material coated with solid electrolyte, and there is no description about the positive electrode.

The inventors of the disclosure studied with the aim of charging a lithium ion secondary battery to 100% with about the same time as gasoline refueling time. Then, they focused on shortening the lithium ion conduction time as one method for shortening the charging time of the lithium ion secondary battery.

The lithium ion conduction time of the lithium ion secondary battery is related to the lithium ion conduction resistance and the diffusion resistance due to lithium ion concentration diffusion. Then, it was found that, regarding the lithium ion conduction resistance and the lithium ion diffusion resistance, the latter resistance is large, and in order to realize fast charging, it is more effective to reduce the lithium ion diffusion resistance.

Here, in order to reduce the lithium ion diffusion resistance, the distance by which lithium ions move, that is, the distance between the positive electrode and the negative electrode may be shortened. According to the calculation of the inventors of the disclosure, it was found that, when the solid battery uses solid or gel electrolyte, in order to charge the battery to 100% in 3 minutes, which is about the same time as gasoline refueling time, for example, it is necessary to set the distance by which lithium ions move to 3.4 µm or less.

In the case of a solid battery, for example, the most effective method for setting the distance by which lithium ions move to 3.4 µm or less is to reduce the thickness of the electrode mixture layer. However, since this method forms a thin film electrode, the energy density of the obtained solid battery is sacrificed.

In view of the above, the disclosure realizes a solid battery that can be charged to 100% even by fast charging of only about 3 minutes without lowering the energy density. Therefore, the disclosure provides a filamentary positive electrode for solid battery, a solid battery having the filamentary positive electrode for solid battery, a manufacturing method of the filamentary positive electrode for solid battery, and a manufacturing method of the solid battery having the filamentary positive electrode for solid battery.

SUMMARY

The inventors of the disclosure studied keenly about how to shorten the distance by which lithium ions move, that is, the distance between the positive electrode and the negative electrode without lowering the energy density. Then, they found that the above problem can be solved by the following configuration and completed the disclosure. That is, the structure of the positive electrode that constitutes the solid battery is a filamentous structure. A positive electrode active material layer including a positive electrode active material is provided on a surface of a conductive positive electrode filament, and a positive electrode electrolyte layer including an electrolyte is further provided on an outer side of the positive electrode active material layer to form a filamentary positive electrode for solid battery. The filamentary positive electrode for solid battery and a filamentary negative electrode for solid battery, which has a filamentous structure, are laminated to form a solid battery.

That is, an embodiment of the disclosure is a filamentary positive electrode for solid battery, including: a positive electrode active material layer, which includes a positive electrode active material, on a surface of a conductive positive electrode filament; and a positive electrode electrolyte layer, which includes an electrolyte, on an outer side of the positive electrode active material layer.

Another embodiment of the disclosure is a solid battery, including the above filamentary positive electrode for solid battery and a negative electrode, wherein the negative electrode is a filamentary negative electrode for solid battery, which includes a conductive negative electrode filament, and the filamentary positive electrode for solid battery and the filamentary negative electrode for solid battery are laminated alternately.

Another embodiment of the disclosure is a manufacturing method of a filamentary positive electrode for solid battery, including: a positive electrode active material layer forming process of forming a positive electrode active material layer, which includes a positive electrode active material, on a surface of a conductive positive electrode filament; and a positive electrode electrolyte layer forming process of forming a positive electrode electrolyte layer, which includes an electrolyte, on an outer side of the positive electrode active material layer.

Another embodiment of the disclosure is a manufacturing method of a solid battery, including: a laminating process of alternately laminating the filamentary positive electrode for solid battery and a filamentary negative electrode for solid battery, which includes a conductive negative electrode filament, to obtain a positive and negative electrode laminate; and a compressing process of compressing the positive and negative electrode laminate to bring the filamentary positive electrode for solid battery and the filamentary negative electrode for solid battery into close contact with each other.

DESCRIPTION OF THE EMBODIMENTS

Hereinafter, embodiments of the disclosure will be described with reference to the drawings.

<Filamentary Positive Electrode for Solid Battery>

A filamentary positive electrode for solid battery of the disclosure is a filamentous structure and has a positive electrode active material layer and a positive electrode electrolyte layer on the outer side of the positive electrode active material layer. The positive electrode active material layer includes a positive electrode active material on the surface of a conductive positive electrode filament, and the positive electrode electrolyte layer includes an electrolyte.

Figure 1:
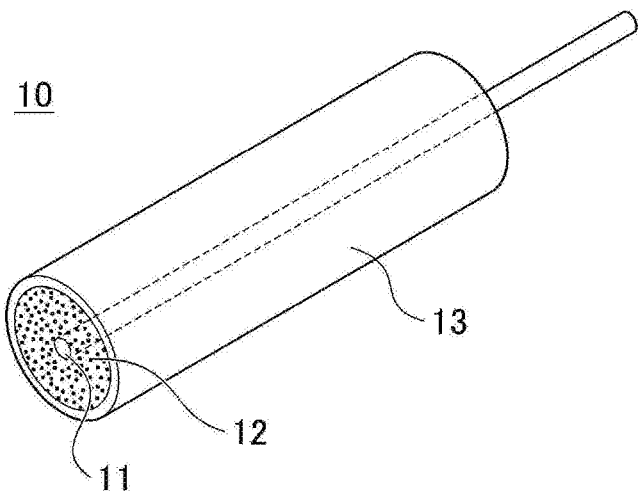
FIG. 1 is a view showing an embodiment of the filamentary positive electrode for solid battery of the disclosure.

FIG. 1 is a view showing an embodiment of the filamentary positive electrode for solid battery of the disclosure. According to an embodiment, the filamentary positive electrode 10 for solid battery of the disclosure has a conductive positive electrode filament 11 at the center and has a positive electrode active material layer 12 including a positive electrode active material on the surface of the positive electrode filament 11. The filamentary positive electrode 10 for solid battery further has a positive electrode electrolyte layer 13 including an electrolyte on the outer side of the positive electrode active material layer 12. The filamentary positive electrode 10 for solid battery according to an embodiment has a substantially circular cross-sectional shape.

[Shape]

The shape of the filament that is to serve as the filamentary positive electrode for solid battery of the disclosure is not particularly limited, and the cross section of the filament may have a substantially circular shape, a substantially polygonal shape or the like. Among these, a circular shape or a polygonal shape is preferable for the distances from the positive electrode filament, which is the center, to the positive electrode electrolyte layer, which is the outermost layer, are substantially equal. Among polygonal shapes, a triangular shape, a quadrangular shape (square), a hexagonal shape or the like that can be packed most closely is preferable for it improves the energy density.

When the filament that is to serve as the filamentary positive electrode for solid battery is laminated alternately with a filament that is to serve as a filamentary negative electrode for solid battery to form a positive and negative electrode laminate, if the shape of the filamentary positive electrode for solid battery is substantially the same as the shape of the filamentary negative electrode for solid battery, a denser laminate can be formed. As a result, the distance by which lithium ions move can be shortened.

FIG. 3(a) to FIG. 3(c) and FIG. 5 show various embodiments of the filamentary positive electrode for solid battery of the disclosure. A filamentary positive electrode 30 for solid battery in FIG. 3(a) has a conductive positive electrode filament 31 at the center, a positive electrode active material layer 32 including a positive electrode active material on the surface of the positive electrode filament 31, and a positive electrode electrolyte layer 33 including an electrolyte on the outer side of the positive electrode active material layer 32. The cross section of the filamentary positive electrode 30 for solid battery has a substantially quadrangular shape. In addition, the cross section of a filamentary positive electrode

Figure 3A:
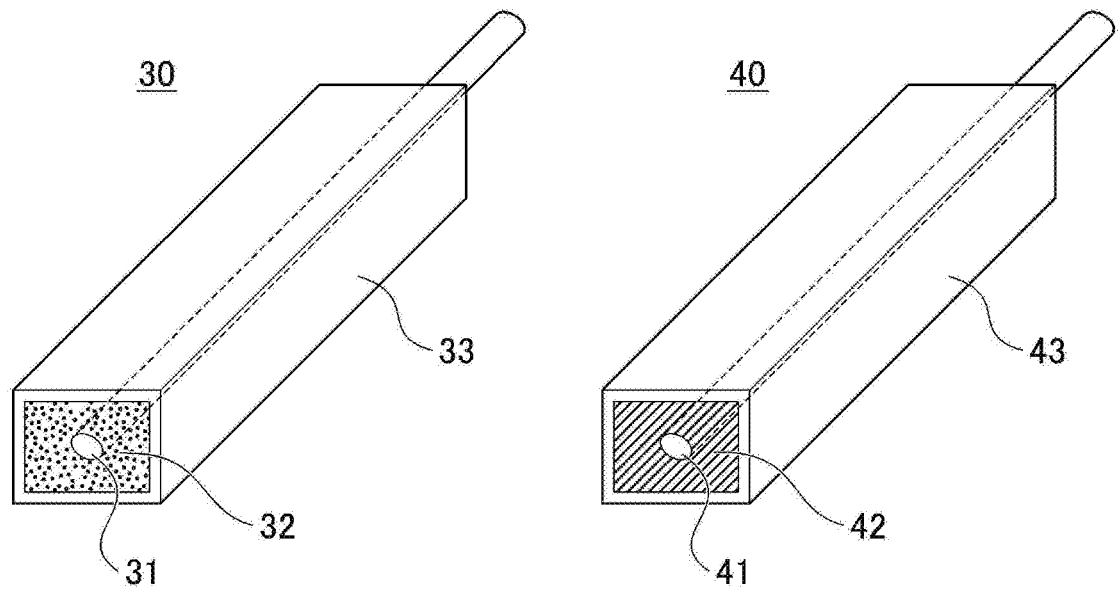
FIG. 3(a) to FIG. 3(c) are views showing various embodiments of the filamentary positive electrode for solid battery of the disclosure and the filamentary negative electrode for solid battery that can be used in the disclosure.
Figures 3B, 3C:
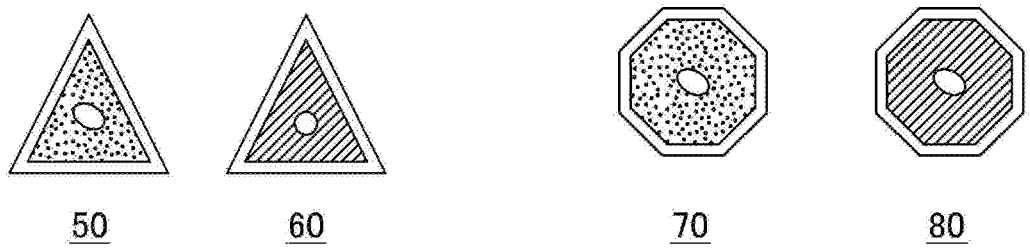

50 for solid battery in FIG. 3(b) has a substantially triangular shape, and the cross section of a filamentary positive electrode 70 for solid battery in FIG. 3(c) has a substantially octagonal shape. Further, the cross section of the filamentary positive electrode 70 for solid battery shown in FIG. 5 has a substantially hexagonal shape.

[Diameter]

The diameter of the filament that is to serve as the filamentary positive electrode for solid battery of the disclosure is not particularly limited, but is preferably in the range of 0.05 μm to 50 μm for the purpose of shortening the distance by which lithium ions move, that is, the distance between the positive electrode and the negative electrode. Furthermore, when the solid battery using the filamentary positive electrode for solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the diameter of the filament that is to serve as the filamentary positive electrode for solid battery to the range of 0.1 μm to 4.0 μm.

[Positive Electrode Filament]

The positive electrode filament constituting the filamentary positive electrode for solid battery of the disclosure is a conductive filament.

(Shape)

The shape of the filament that is to serve as the positive electrode filament is not particularly limited, and the cross section of the filament may have a substantially circular shape or a substantially polygonal shape, or the filament may have an irregular cross section. Among these, the filament having a roughened surface or a surface coated with carbon is preferable for it can reduce the contact resistance with the active material.

(Material)

The material of the filament that is to serve as the positive electrode filament exhibits a nobler potential than the charging and discharging potential of the compound that constitutes the negative electrode. For example, if a material that provides a sufficiently high standard electrode potential with respect to the standard electrode potential of the filamentary negative electrode for solid battery is selected, it is possible to improve the characteristics as a solid battery and realize a desired battery voltage.

In the disclosure, the material of the filament that is to serve as the positive electrode filament may be a carbon fiber, a metal wire such as an aluminum wire and a steel wire, or polyolefin, a cotton filament, or a silk thread coated with metal, for example.

(Diameter)

The diameter of the filament that is to serve as the positive electrode filament is not particularly limited, but is preferably in the range of 0.01 μm to 15 μm for the purpose of shortening the distance by which lithium ions move, that is, the distance between the positive electrode and the negative electrode. Furthermore, when the solid battery using the filamentary positive electrode for solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the diameter of the filament that is to serve as the positive electrode filament to the range of 0.01 μm to 0.5 μm.

[Positive Electrode Active Material Layer]

The positive electrode active material layer is a layer disposed on the surface of the positive electrode filament and includes a positive electrode active material. It is preferable that the positive electrode active material includes a material having an operating upper limit potential of 4.2 V (vs. $Li/Li^+$) or more within the range of the operating voltage of the lithium ion secondary battery. Thereby, a battery with high energy density can be stably realized.

(Material)

The positive electrode active material layer normally includes a lithium compound as the positive electrode active material. The lithium compound is not particularly limited if it is used as the positive electrode active material of the lithium ion secondary battery. For example, a lithium alloy or a lithium complex can also be used.

In addition, the positive electrode active material layer may include components other than the positive electrode active material, such as a conductive aid, a binder, and a solid electrolyte. The conductive material may be a carbon material such as acetylene black, for example. The binder may be a halogenated vinyl resin such as polyvinylidene fluoride (PVDF), for example.

(Thickness)

The thickness of the positive electrode active material layer is not particularly limited if the thickness covers the positive electrode filament, but it is preferably in the range of 0.03 μm to 49.9 μm for the purpose of shortening the distance by which lithium ions move, that is, the distance between the positive electrode and the negative electrode. Furthermore, when the solid battery using the filamentary positive electrode for solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the thickness of the positive electrode active material layer to the range of 0.05 μm to 3.4 μm.

[Positive Electrode Electrolyte Layer]

The positive electrode electrolyte layer is disposed on the outer side of the positive electrode active material layer and includes the electrolyte of the lithium ion solid battery. In the disclosure, the positive electrode electrolyte layer is not particularly limited if it can carry out ion conduction between the filamentary positive electrode for solid battery and the filamentary negative electrode for solid battery, and it may be solid or gel.

(Material)

The electrolyte to be used in the filamentary positive electrode for solid battery is not particularly limited if it can be used for a lithium ion battery. The electrolyte may be an oxide-based or sulfide-based solid electrolyte, for example.

In addition, the positive electrode electrolyte layer may include other components such as a binding agent if necessary. The composition ratio of each substance included in the positive electrode electrolyte layer is not particularly limited if the battery operates properly.

(Thickness)

The thickness of the positive electrode electrolyte layer is not particularly limited, but it is preferably in the range of 0.02 μm to 15 μm for the purpose of shortening the distance by which lithium ions move, that is, the distance between the positive electrode and the negative electrode and for the purpose of preventing a short circuit between the positive electrode and the negative electrode when the positive and negative electrode laminate is formed by alternately laminating the filamentary positive electrode for solid battery and the filamentary negative electrode for solid battery. Furthermore, when the solid battery using the filamentary positive electrode for solid battery of the disclosure is installed in an automobile and it is desired to set the charging time for charging to 100% to 3 minutes, which is about the same as gasoline refueling time, the distance by which lithium ions move needs to be set to 3.4 µm or less. Therefore, it is preferable to set the thickness of the positive electrode electrolyte layer to the range of 0.03 µm to 0.1 µm.

The thickness of the positive electrode electrolyte layer is preferably larger than the thickness of the negative electrode electrolyte layer included in the filamentary negative electrode for solid battery. In the solid battery, the factor that has the greatest influence on the battery performance is formation of the contact interface between the positive electrode active material and the positive electrode electrolyte layer in the positive electrode. On the other hand, it is easier to form the contact interface between the negative electrode active material and the electrolyte in the negative electrode. Therefore, the thickness of the positive electrode electrolyte layer on the positive electrode side is an important factor in the solid battery, and in the disclosure, it is preferable that the thickness of the positive electrode electrolyte layer is larger than the thickness of the negative electrode electrolyte layer.

[Other Layers]

The conductive positive electrode filament, the positive electrode active material layer including the positive electrode active material, and the positive electrode electrolyte layer including the electrolyte are essential layers, but the filamentary positive electrode for solid battery of the disclosure may include any layer in addition to these layers.

The any layer may be a coating layer or the like, for example. The coating layer is preferably provided between the positive electrode active material layer and the positive electrode electrolyte layer so that the adhesion between the positive electrode active material layer and the positive electrode electrolyte layer can be enhanced to prevent peeling.

<Manufacturing Method of Filamentary Positive Electrode for Solid Battery>

The filamentary positive electrode for solid battery of the disclosure as described above can be obtained by a manufacturing method, which includes a positive electrode active material layer forming process of forming the positive electrode active material layer including the positive electrode active material on the surface of the conductive positive electrode filament, and a positive electrode electrolyte layer forming process of forming the positive electrode electrolyte layer including the electrolyte on the outer side of the positive electrode active material layer.

[Positive Electrode Active Material Layer Forming Process]

In the positive electrode active material layer forming process, the positive electrode active material layer including the positive electrode active material is formed on the surface of the conductive positive electrode filament. A method of forming the positive electrode active material layer is not particularly limited, and may be a method of preparing a positive electrode mixture slurry, immersing a positive electrode filament in the slurry and then drying it; a thin film forming method such as sputtering, CVD and a pulse laser film forming method; an electric field deposition method; or an electroplating method, for example.

[Positive Electrode Electrolyte Layer Forming Process]

In the positive electrode electrolyte layer forming process, the positive electrode electrolyte layer including the electrolyte is formed on the outer side of the positive electrode active material layer. A method of forming the positive electrode electrolyte layer is not particularly limited, and may be a method of preparing a slurry or solution including a solid electrolyte precursor, immersing a filament for forming the positive electrode electrolyte layer in the slurry or solution and then drying and firing it; a thin film forming method such as sputtering, CVD and a pulse laser film forming method; an electric field deposition method; or an electroplating method, for example.

First Embodiment: Thin Film Forming Method

The first embodiment of the manufacturing method of the filamentary positive electrode for solid battery of the disclosure is a method of manufacturing the filamentary positive electrode for solid battery by a thin film forming method. Since the thin film forming method can form a thin layer, the thin film forming method is preferable for shortening the distance between the positive electrode and the negative electrode to shorten the distance of movement of lithium ions.

(Positive Electrode Active Material Layer Forming Process)

In the positive electrode active material layer forming process of the first embodiment, a substance that is to serve as the positive electrode active material layer is attached to the surface of the conductive positive electrode filament by the thin film forming method such as sputtering, CVD, or a pulse laser film forming method, and then dried, so as to form a thin positive electrode active material layer.

(Positive Electrode Electrolyte Layer Forming Process)

After the positive electrode active material layer is formed, another layer such as a coating layer is formed if necessary. Subsequently, a substance that is to serve as the positive electrode electrolyte layer is attached to the outer side of the positive electrode active material layer by the thin film forming method such as sputtering, CVD, or a pulse laser film forming method, and then dried, so as to form a thin positive electrode electrolyte layer.

Second Embodiment: Coating/Firing Method

The second embodiment of the manufacturing method of the filamentary positive electrode for solid battery of the disclosure is a method of manufacturing the filamentary positive electrode for solid battery by a coating/firing method. This method has merit in terms of manufacturing cost as compared with the thin film forming method described above.

(Positive Electrode Active Material Layer Forming Process)

In the positive electrode active material layer forming process of the second embodiment, a positive electrode mixture slurry is prepared, and a positive electrode filament is immersed in the slurry and then dried, so as to form a positive electrode active material layer.

The positive electrode mixture slurry prepared in the second embodiment may be the same as the slurry used in the conventional method that forms the positive electrode by coating. Specifically, the slurry includes a positive electrode active material which is nanoparticles, a binding agent such as PVDF, a conductive aid if necessary, and a solvent. The mixing ratio of the slurry is not particularly limited. Moreover, the preparation method of the slurry is not particularly limited either, and may be a method of mixing by mechanical milling such as a ball mill, for example.

(Positive Electrode Electrolyte Layer Forming Process)

After the positive electrode active material layer is formed, another layer such as a coating layer is formed if necessary. Subsequently, a slurry including a solid electrolyte precursor is prepared, and a filament for forming the positive electrode electrolyte layer is immersed in the slurry and then dried and fired, so as to form a thin positive electrode electrolyte layer.

The slurry including the solid electrolyte precursor prepared in the second embodiment may be an ethanol-THF mixture solution that includes $Li_2S$, $P_2S_5$, LiBr, or LiCl, for example. The subsequent firing temperature is 550° C., for example.

<Solid Battery>

A solid battery of the disclosure includes the filamentary positive electrode for solid battery of the disclosure and a negative electrode. The negative electrode constituting the solid battery of the disclosure is a filamentary negative electrode for solid battery which includes a conductive negative electrode filament. A positive and negative electrode laminate is formed by alternately laminating the filamentary positive electrode for solid battery of the disclosure and the filamentary negative electrode for solid battery.

Figure 4:
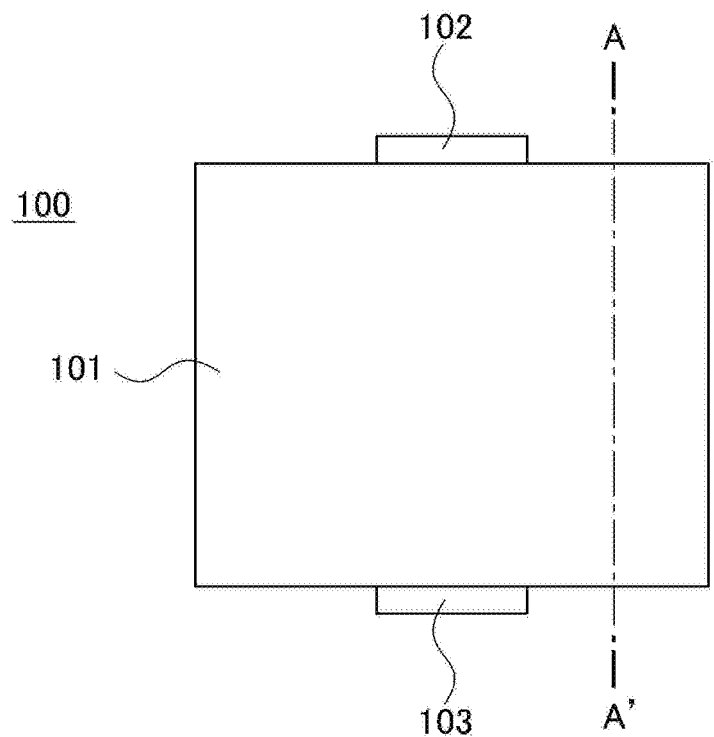
FIG. 4 is a view showing an embodiment of the solid battery of the disclosure.

An embodiment of the solid battery of the disclosure is shown in FIG. 4. In FIG. 4, the solid battery 100 includes a positive and negative electrode laminate 101 formed by alternately laminating the filamentary positive electrode for solid battery and the filamentary negative electrode for solid battery, and has a positive electrode tab 102 and a negative electrode tab 103.

[Filamentary Positive Electrode for Solid Battery]

The filamentary positive electrode for solid battery which constitutes the solid battery of the disclosure is the filamentary positive electrode for solid battery of the disclosure as described above.

[Filamentary Negative Electrode for Solid Battery]

The filamentary negative electrode for solid battery which constitutes the solid battery of the disclosure is a filamentous structure and includes a conductive negative electrode filament. In addition, the filamentary negative electrode for solid battery which constitutes the solid battery of the disclosure optionally has a negative electrode active material layer, which includes a negative electrode active material, on the surface of the negative electrode filament, and optionally has a negative electrode electrolyte layer including an electrolyte.

Figure 2:
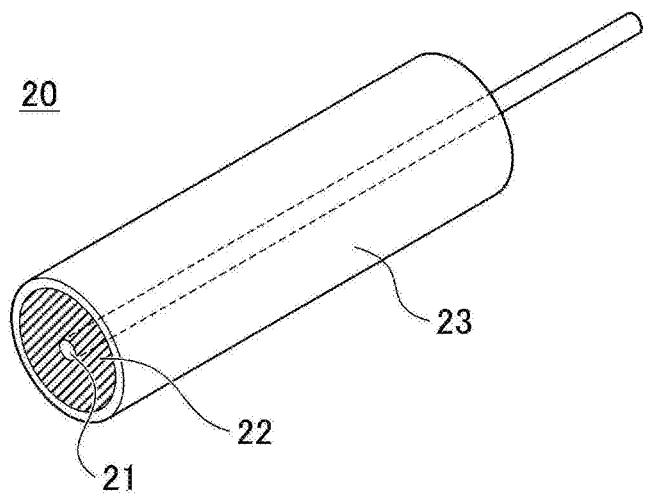
FIG. 2 is a view showing an embodiment of the filamentary negative electrode for solid battery that can be used in the disclosure.

FIG. 2 shows an embodiment of the filamentary negative electrode for solid battery of the disclosure. According to an embodiment, the filamentary negative electrode 20 for solid battery has a conductive negative electrode filament 21 at the center and has a negative electrode active material layer 22, which includes a negative electrode active material, on the surface of the negative electrode filament 21. The filamentary negative electrode 20 for solid battery further has a negative electrode electrolyte layer 23 including an electrolyte on the outer side of the negative electrode active material layer 22. The filamentary negative electrode 20 for solid battery according to an embodiment has a substantially circular cross-sectional shape.

[Shape]

The shape of the filament that is to serve as the filamentary negative electrode for solid battery, which constitutes the solid battery of the disclosure, is not particularly limited, and the cross section of the filament may have a substantially circular shape, a substantially polygonal shape or the like. Among polygonal shapes, a triangular shape, a quadrangular shape (square), a hexagonal shape or the like that can be packed most closely is preferable for it improves the energy density.

When the filamentary negative electrode for solid battery is laminated alternately with the filamentary positive electrode for solid battery of the disclosure to form a positive and negative electrode laminate, if the shape of the filamentary negative electrode for solid battery is substantially the same as the shape of the filamentary positive electrode for solid battery, a denser laminate can be formed. As a result, the distance by which lithium ions move can be shortened.

FIG. 3(a) to FIG. 3(c) and FIG. 5 show various embodiments of the filamentary negative electrode for solid battery, which constitutes the solid battery of the disclosure. A filamentary negative electrode 40 for solid battery in FIG. 3(a) has a conductive negative electrode filament 41 at the center, a negative electrode active material layer 42 including a negative electrode active material on the surface of the negative electrode filament 41, and a negative electrode electrolyte layer 43 including an electrolyte on the outer side of the negative electrode active material layer 42. The cross section of the filamentary negative electrode 40 for solid battery has a substantially quadrangular shape. In addition, the cross section of a filamentary negative electrode 60 for solid battery in FIG. 3(b) has a substantially triangular shape, and the cross section of a filamentary negative electrode 80 for solid battery in FIG. 3(c) has a substantially octagonal shape. Further, the cross section of the filamentary negative electrode 80 for solid battery shown in FIG. 5 has a substantially hexagonal shape.

[Diameter]

The diameter of the filament that is to serve as the filamentary negative electrode for solid battery, which constitutes the solid battery of the disclosure, is not particularly limited, but is preferably in the range of 0.05 μm to 50 μm for the purpose of shortening the distance by which lithium ions move, that is, the distance between the positive electrode and the negative electrode. Furthermore, when the solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the diameter of the filament that is to serve as the filamentary negative electrode for solid battery to the range of 0.1 μm to 4.0 μm.

(Negative Electrode Filament)

The negative electrode filament that constitutes the filamentary negative electrode for solid battery used in the solid battery of the disclosure is a conductive filament. In the case where the material of the filament that is to serve as the negative electrode filament is a negative electrode active material for lithium ion electrode, the filament can be directly used as a negative electrode. Additionally, in the case where the material of the filament is not a negative electrode active material for lithium ion electrode, it is preferable to dispose a negative electrode active material layer, which includes a negative electrode active material, on the surface of the negative electrode filament.

(Shape)

The shape of the filament that is to serve as the negative electrode filament is not particularly limited, and the cross section of the filament may have a substantially circular shape or a substantially polygonal shape, or the filament may have an irregular cross section. Among these, a circular shape or a polygonal shape is preferable. In addition, among polygonal shapes, a triangular shape, a quadrangular shape (square), a hexagonal shape or the like that can be packed most closely is preferable for it improves the energy density.

(Material)

The material of the filament that is to serve as the negative electrode filament is not particularly limited, and may be a carbon fiber, a metal wire such as a copper wire and a nickel wire, or polyolefin, a cotton filament, or a silk thread coated with metal, for example.

(Diameter)

The diameter of the filament that is to serve as the negative electrode filament is not particularly limited, but is preferably in the range of 0.01 μm to 15 μm for the purpose of shortening the distance by which lithium ions move, that is, the distance between the positive electrode and the negative electrode. Furthermore, when the solid battery using the filamentary positive electrode for solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the diameter of the filament that is to serve as the negative electrode filament to the range of 0.01 μm to 0.5 μm.

[Negative Electrode Active Material Layer]

The negative electrode active material layer is a layer that is optionally disposed on the surface of the negative electrode filament, and includes a negative electrode active material. For example, when a carbon fiber is used as the negative electrode filament, since the carbon fiber itself can be a negative electrode active material, it is not necessary to form the negative electrode active material layer on the surface of the negative electrode filament. However, in such a case, the negative electrode active material layer may be optionally formed.

(Material)

The negative electrode active material included in the negative electrode active material layer can be used without particular limitation if it can be used as the negative electrode active material in a lithium ion secondary battery. The negative electrode active material may be graphite-based carbon such as natural graphite, artificial graphite and amorphous coated graphite, for example.

In addition, the negative electrode active material layer may include components other than the negative electrode active material, such as a thickener or a binder, a solid electrolyte and the like. The thickener may be celluloses such as carboxymethylcellulose (CMC), for example. The binder may be rubbers such as styrene butadiene rubber (SBR), and a halogenated vinyl resin such as polyvinylidene fluoride (PVDF), for example.

(Thickness)

The thickness of the optionally disposed negative electrode active material layer is not particularly limited if the thickness covers the negative electrode filament, but it is preferably in the range of 0.03 μm to 49.9 μm for the purpose of shortening the distance by which lithium ions move, that is, the distance between the positive electrode and the negative electrode. Furthermore, when the solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the thickness of the negative electrode active material layer to the range of 0.05 μm to 3.4 μm.

[Negative Electrode Electrolyte Layer]

The negative electrode electrolyte layer is a layer that is optionally disposed on the outer side of the negative electrode filament, and includes the electrolyte of the lithium ion solid battery. In the disclosure, the negative electrode electrolyte layer is not particularly limited if it can carry out ion conduction between the filamentary positive electrode for solid battery and the filamentary negative electrode for solid battery, and it may be solid or gel.

(Material)

The electrolyte to be used in the filamentary negative electrode for solid battery is not particularly limited if it can be used for a lithium ion battery. The electrolyte may be an oxide-based or sulfide-based solid electrolyte, for example.

In addition, the negative electrode electrolyte layer may include other components such as a binding agent if necessary. The composition ratio of each substance included in the negative electrode electrolyte layer is not particularly limited if the battery operates properly.

(Thickness)

The thickness of the negative electrode electrolyte layer is not particularly limited, but it is preferably in the range of 0.02 μm to 15 μm for the purpose of shortening the distance by which lithium ions move, that is, the distance between the positive electrode and the negative electrode and for the purpose of preventing a short circuit between the positive electrode and the negative electrode when the positive and negative electrode laminate is formed by alternately laminating the filamentary positive electrode for solid battery and the filamentary negative electrode for solid battery. Furthermore, when the solid battery of the disclosure is installed in an automobile and it is desired to set the charging time for charging to 100% to 3 minutes, which is about the same as gasoline refueling time, the distance by which lithium ions move needs to be set to 3.4 μm or less. Therefore, it is preferable to set the thickness of the negative electrode electrolyte layer to the range of 0.03 μm to 0.1 μm.

[Positive and Negative Electrode Laminate]

The solid battery of the disclosure includes a positive and negative electrode laminate formed by alternately laminating the filamentary positive electrode for solid battery of the disclosure and the filamentary negative electrode for solid battery as described above.

(Laminate Structure)

The laminate structure of the positive and negative electrode laminate is not particularly limited, and it may be a structure formed by alternately stacking the filament of the filamentary positive electrode for solid battery and the filament of the filamentary negative electrode for solid battery in the same direction, or a structure formed by knitting (such as plain weave, twill weave and the like) the filament of the filamentary positive electrode for solid battery and the filament of the filamentary negative electrode for solid battery, for example.

Figure 5:
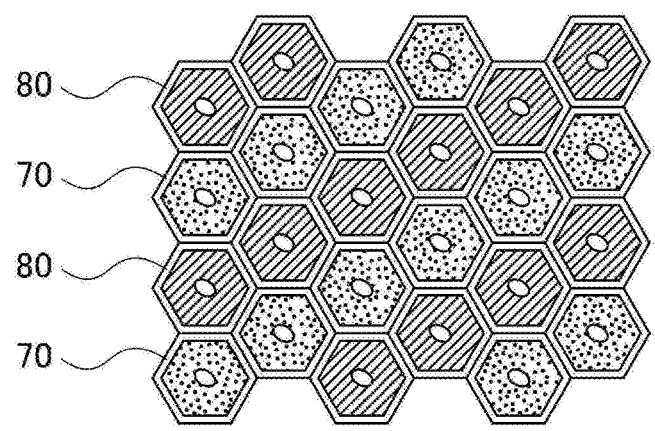
FIG. 5 is a view showing an embodiment of the positive and negative electrode laminate in the solid battery of the disclosure.
Figure 7:
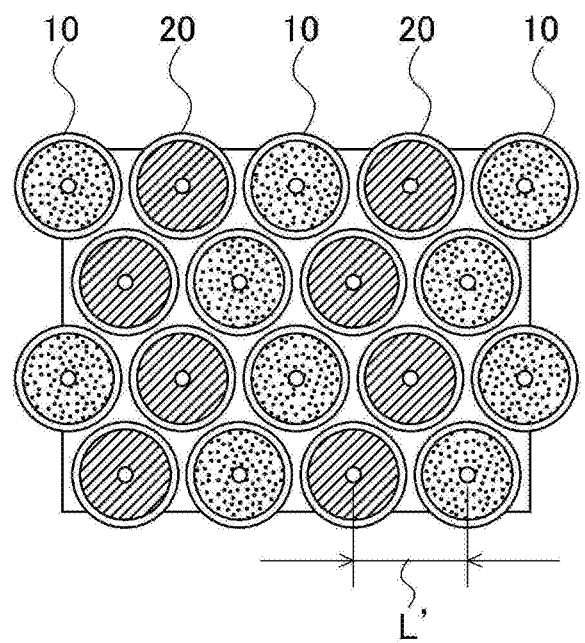
FIG. 7 is a view showing an embodiment of the positive and negative electrode laminate in the solid battery of the disclosure.

FIG. 5 and FIG. 7 show an embodiment of the positive and negative electrode laminate in the solid battery of the disclosure. The positive and negative electrode laminate shown in FIG. 5 and FIG. 7 is a cross-sectional view, taken along the line A'-A, of the positive and negative electrode laminate 101 according to an embodiment of the solid battery of the disclosure shown in FIG. 4.

In the positive and negative electrode laminate shown in FIG. 5, filamentary positive electrodes 70 for solid battery, which have a hexagonal cross section, and filamentary negative electrodes 80 for solid battery, which have a hexagonal cross section, are alternately and densely arranged through the solid electrolytes of the respective filaments so that the cross section becomes a honeycomb shape. Further, in the positive and negative electrode laminate shown in FIG. 7, the filamentary positive electrodes 10 for solid battery, which have a substantially circular cross section, and the filamentary negative electrodes 20 for solid battery, which have a substantially circular cross section, are alternately arranged to be substantially in parallel through the solid electrolytes of the respective filaments.

(Distance between Positive Electrode Filament and Negative Electrode Filament)

In the positive and negative electrode laminate, the distance between the positive electrode filament located at the center of the filamentary positive electrode for solid battery, and the negative electrode filament located at the center of the filamentary negative electrode for solid battery is the distance by which lithium ions move. Therefore, in the disclosure, it is preferable to shorten this distance, and the distance between the positive electrode filament and the negative electrode filament is preferably in the range of 0.1 µm to 100 µm. Furthermore, when the solid battery of the disclosure is installed in an automobile and it is desired to set the charging time for charging to 100% to 3 minutes, which is about the same as gasoline refueling time, it is preferable to set the distance between the positive electrode filament and the negative electrode filament, which is the distance by which lithium ions move, to 3.4 µm or less.

Figure 6:
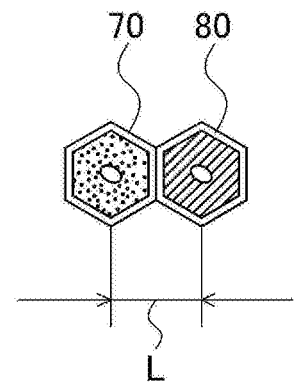
FIG. 6 is a view showing the distance between the filamentary positive electrode for solid battery and the filamentary negative electrode for solid battery.

FIG. 6 and FIG. 7 show the distance between the positive electrode filament and the negative electrode filament. In FIG. 6, the distance between the positive electrode filament located at the center of the filamentary positive electrode 70 for solid battery and the negative electrode filament located at the center of the filamentary negative electrode 80 for solid battery is L. In addition, in FIG. 7, the distance between the positive electrode filament located at the center of the filamentary positive electrode 10 for solid battery and the negative electrode filament located at the center of the filamentary negative electrode 20 for solid battery is L'.

<Manufacturing Method of Solid Battery>

A manufacturing method of the solid battery of the disclosure includes a laminating process of alternately laminating the filamentary positive electrode for solid battery of the disclosure and the filamentary negative electrode for solid battery as described above to obtain a positive and negative electrode laminate, and a compressing process of compressing the positive and negative electrode laminate to bring the filamentary positive electrode for solid battery and the filamentary negative electrode for solid battery into close contact with each other.

[Laminating Process]

In the laminating process, the filamentary positive electrode for solid battery of the disclosure and the filamentary negative electrode for solid battery as described above are alternately laminated to obtain the positive and negative electrode laminate. The method of laminating alternately is not particularly limited, and may be a method of arranging the filament of the filamentary positive electrode for solid battery and the filament of the filamentary negative electrode for solid battery to face in the same direction to form layers alternately, or a method of knitting (such as plain weave, twill weave and the like) the filament of the filamentary positive electrode for solid battery and the filament of the filamentary negative electrode for solid battery, for example.

[Compressing Process]

In the compressing process, the positive and negative electrode laminate obtained in the above laminating process is compressed to bring the filamentary positive electrode for solid battery and the filamentary negative electrode for solid battery into close contact with each other. The method of compressing is not particularly limited, and may be uniaxial press, roll press or the like, for example.

In the case where the filamentary negative electrode for solid battery has the negative electrode active material layer on the surface of the negative electrode filament, in the laminating process, the positive electrode electrolyte layer and the negative electrode active material layer are brought into contact with each other and laminated, and in the compressing process, the positive electrode active material layer and the negative electrode active material layer are pressure-bonded without a gap through the positive electrode electrolyte layer.

In the case where the filamentary negative electrode for solid battery has the negative electrode electrolyte layer as the outermost layer, in the laminating process, the positive electrode electrolyte layer and the negative electrode electrolyte layer are brought into contact with each other and laminated, and in the compressing process, the positive electrode electrolyte layer and the negative electrode electrolyte layer are pressure-bonded to be integrated.

An embodiment of the disclosure is a filamentary positive electrode for solid battery, including: a positive electrode active material layer, which includes a positive electrode active material, on a surface of a conductive positive electrode filament; and a positive electrode electrolyte layer, which includes an electrolyte, on an outer side of the positive electrode active material layer.

Another embodiment of the disclosure is a solid battery, including the above filamentary positive electrode for solid battery and a negative electrode, wherein the negative electrode is a filamentary negative electrode for solid battery, which includes a conductive negative electrode filament, and the filamentary positive electrode for solid battery and the filamentary negative electrode for solid battery are laminated alternately.

The filamentary negative electrode for solid battery may include a negative electrode active material layer, which includes a negative electrode active material, on a surface of the conductive negative electrode filament.

The filamentary negative electrode for solid battery may include a negative electrode electrolyte layer, which includes an electrolyte, on an outer side of the negative electrode filament.

A distance between the positive electrode filament and the negative electrode filament may be 3.4 µm or less.

A thickness of the positive electrode electrolyte layer may be larger than a thickness of the negative electrode electrolyte layer.

Another embodiment of the disclosure is a manufacturing method of a filamentary positive electrode for solid battery, including: a positive electrode active material layer forming process of forming a positive electrode active material layer, which includes a positive electrode active material, on a surface of a conductive positive electrode filament; and a positive electrode electrolyte layer forming process of forming a positive electrode electrolyte layer, which includes an electrolyte, on an outer side of the positive electrode active material layer.

Another embodiment of the disclosure is a manufacturing method of a solid battery, including: a laminating process of alternately laminating the filamentary positive electrode for solid battery and a filamentary negative electrode for solid battery, which includes a conductive negative electrode filament, to obtain a positive and negative electrode laminate; and a compressing process of compressing the positive and negative electrode laminate to bring the filamentary positive electrode for solid battery and the filamentary negative electrode for solid battery into close contact with each other.

The filamentary negative electrode for solid battery may include a negative electrode active material layer, which includes a negative electrode active material, on a surface of the conductive negative electrode filament, and in the laminating process, the positive electrode electrolyte layer and the negative electrode active material layer may be brought into contact with each other.

The filamentary negative electrode for solid battery may include a negative electrode electrolyte layer, which includes an electrolyte, on an outer side of the negative electrode active material layer, and in the laminating process, the positive electrode electrolyte layer and the negative electrode electrolyte layer may be brought into contact with each other.

In the laminating process, a distance between the positive electrode filament and the negative electrode filament may be set to 3.4 µm or less.

With the filamentary positive electrode for solid battery of the disclosure, it is possible to realize a solid battery that can be charged to 100% even by fast charging of only about 3 minutes without lowering the energy density. Therefore, when a solid battery including the filamentary positive electrode for solid battery of the disclosure is installed in an automobile, it is possible to charge the automobile to 100% with about the same time as gasoline refueling time.

What is claimed is:

1. A solid battery comprising:
   a positive electrode having a filament shape, comprising:
      a positive electrode active material layer, which comprises a positive electrode active material, on a surface of a conductive positive electrode filament, and
      a positive electrode electrolyte layer, which comprises an electrolyte, on an outer side of the positive electrode active material layer; and
   a negative electrode having a filament shape,
   wherein the negative electrode comprises a conductive negative electrode filament, and
   the positive electrode and the negative electrode are laminated alternately,
   wherein a distance between the conductive positive electrode filament and the conductive negative electrode filament is 3.4 µm or less,
   a thickness of the positive electrode active material layer is in a range of 0.05 µm to 3.4 µm,
   a cross section of the positive electrode and a cross section of the negative electrode have a triangular shape, a hexagonal shape or an octagonal shape, and
   the negative electrode is formed without a negative electrode active material.

2. The solid battery according to claim 1, wherein the negative electrode comprises a negative electrode electrolyte layer, which comprises an electrolyte, on an outer side of the negative electrode filament.

3. The solid battery according to claim 2, wherein a thickness of the positive electrode electrolyte layer is larger than a thickness of the negative electrode electrolyte layer.

4. A solid battery comprising:
   a positive electrode having a filament shape, comprising:
      a positive electrode active material layer, which comprises a positive electrode active material, on a surface of a conductive positive electrode filament, and
      a positive electrode electrolyte layer, which comprises an electrolyte, on an outer side of the positive electrode active material layer;
   a negative electrode having a filament shape,
   wherein the negative electrode comprises a conductive negative electrode filament, and
   the positive electrode and the negative electrode are laminated alternately,
   wherein a distance between the conductive positive electrode filament and the conductive negative electrode filament is 3.4 µm or less,
   a thickness of the positive electrode active material layer is in a range of 0.05 µm to 3.4 µm,
   a cross section of the positive electrode and a cross section of the negative electrode have a triangular shape, a hexagonal shape or an octagonal shape, and
   a thickness of a negative electrode electrolyte layer is 0.

5. The solid battery according to claim 4, wherein the negative electrode for solid battery comprises a negative electrode active material layer, which comprises a negative electrode active material, on a surface of the conductive negative electrode filament.

* * * * *